United States Patent
Fujita et al.

(10) Patent No.: US 9,305,711 B2
(45) Date of Patent: Apr. 5, 2016

(54) CARBON NANOSTRUCTURE, CAPACITOR, METHOD FOR PROCESSING CARBON NANOSTRUCTURE, AND METHOD FOR PRODUCING CARBON NANOSTRUCTURE

(75) Inventors: Jun-ichi Fujita, Tsukuba (JP); Takeshi Hikata, Osaka (JP); Soichiro Okubo, Osaka (JP); Risa Utsunomiya, Kyoto (JP); Teruaki Matsuba, Kyoto (JP)

(73) Assignees: SUMITOMO ELECTRIC INDUSTRIES, LTD., Osaka-shi, Osaka (JP); UNIVERSITY OF TSUKUBA, Tsukuba-shi, Ibaraki (JP)

( * ) Notice: Subject to any disclaimer, the term of this patent is extended or adjusted under 35 U.S.C. 154(b) by 241 days.

(21) Appl. No.: 14/003,332

(22) PCT Filed: Mar. 8, 2012

(86) PCT No.: PCT/JP2012/055918
§ 371 (c)(1),
(2), (4) Date: Sep. 5, 2013

(87) PCT Pub. No.: WO2012/121317
PCT Pub. Date: Sep. 13, 2012

(65) Prior Publication Data
US 2013/0342965 A1    Dec. 26, 2013

(30) Foreign Application Priority Data

Mar. 8, 2011    (JP) .................................. 2011-050388

(51) Int. Cl.
*H01G 9/048*    (2006.01)
*H01G 11/36*    (2013.01)
(Continued)

(52) U.S. Cl.
CPC ................ *H01G 9/048* (2013.01); *B82Y 30/00* (2013.01); *B82Y 40/00* (2013.01); *C01B 31/028* (2013.01);
(Continued)

(58) Field of Classification Search
CPC .......... H01G 9/048; H01G 9/035; H01G 9/00; H01G 9/145
USPC .................. 361/503, 504, 509–512, 523, 525
See application file for complete search history.

(56) References Cited

U.S. PATENT DOCUMENTS 6,780,075 B2 *    8/2004    Okamoto et al. ............... 445/50
2001/0006869 A1    7/2001    Okamoto et al.
(Continued)

FOREIGN PATENT DOCUMENTS

CN    101896424 A    11/2010
JP    2001-180920 A    7/2001
(Continued)

OTHER PUBLICATIONS

R. Ueki et al., "Enormous Shrinkage and elongation of Carbon Nanotube under Low Energy Electron Beam Irradiation with weak Tensile Stress", The Japan Society of Applied Physics, Aug. 30, 2010, 15a-ZM-9.
(Continued)

*Primary Examiner* — Nguyen T Ha
(74) *Attorney, Agent, or Firm* — Drinker Biddle & Reath LLP (57) ABSTRACT

A carbon nanostructure's geometry and electrical characteristics can be controlled. A method for processing a carbon nanostructure according to the present invention includes the steps of: preparing a carbon nanostructure (e.g., a carbon nanotube) (a CNT preparation step); and exposing the carbon nanotube to an energy beam (e.g., an electron beam) while vibrating the carbon nanotube (an exposure step). This facilitates modifying the carbon nanotube in length and electrical characteristics.

10 Claims, 7 Drawing Sheets

(51) Int. Cl.
*C01B 31/02* (2006.01)
*B82Y 30/00* (2011.01)
*B82Y 40/00* (2011.01)
*B82Y 99/00* (2011.01)

(52) U.S. Cl.
CPC ............ *C01B 31/0253* (2013.01); *H01G 11/36* (2013.01); *B82Y 99/00* (2013.01); *C01B 2202/02* (2013.01); *C01B 2202/22* (2013.01); *C01B 2202/34* (2013.01); *C01B 2202/36* (2013.01); *Y02E 60/13* (2013.01)

(56) References Cited

U.S. PATENT DOCUMENTS

| 2002/0193040 | A1 | 12/2002 | Zhou | |
|---|---|---|---|---|
| 2009/0272935 | A1 | 11/2009 | Hata et al. | |
| 2011/0058308 | A1* | 3/2011 | Nishi et al. | 361/503 |

FOREIGN PATENT DOCUMENTS

| JP | 2004058194 A | 2/2004 |
|---|---|---|
| JP | 2006-012551 A | 1/2006 |
| JP | 2007257950 A | 10/2007 |
| JP | 2010099572 A | 5/2010 |
| JP | 2012046388 A | 3/2012 |
| WO | WO-2007/078005 A1 | 7/2007 |

OTHER PUBLICATIONS

R. Ueki et al., "Shrinkage of Carbon Nanotube under Low Energy Electron Beam Irradiation with Supersonic Vibration", The Japan Society of Applied Physics, Mar. 9, 2011, 24p-KV-6.

Ueki, et al., "Enormous Shrinkage of Carbon Nanotubes under Low-Energy Electron Beam Irradiation with Uniaxial Tensile Stress," Japanese Journal of Applied Physics, vol. 50, No. 6, Jun. 20, 2011, pp. 06GE10-1 to 06GE10-5.

Nishio, et al., "Carbon Nanotube Oscillators Toward Zeptogram Detection," Applied Physics Letters, U.S.A., American Institute of Physics, 2005, 86, URL, http://scitation.aip.org/content/aip/journal/apl/86/13/10.1063/1.1896426, pp. 133111-1-133111-3.

* cited by examiner

CARBON NANOSTRUCTURE, CAPACITOR, METHOD FOR PROCESSING CARBON NANOSTRUCTURE, AND METHOD FOR PRODUCING CARBON NANOSTRUCTURE

TECHNICAL FIELD

The present invention relates to a carbon nanostructure, a capacitor, a method for processing the carbon nanostructure and a method for producing the carbon nanostructure, and more specifically to a carbon nanostructure shaped to extend in one direction, a capacitor using the carbon nanostructure, a method for processing the carbon nanostructure and a method for producing the carbon nanostructure.

BACKGROUND ART

Conventionally, a carbon nanostructure such as carbon nanotube (CNT) has been known (see Japanese Patent Laying-Open No. 2010-99572 (hereinafter referred to as patent document 1), for example).

CITATION LIST

Patent Document

PTD 1: Japanese Patent Laying-Open No. 2010-99572

SUMMARY OF INVENTION

Technical Problem

A carbon nanostructure such as a carbon nanotube is a structure formed by carbon atoms aligned to have a diameter of the nanometer level, and is studied for application to various fields such as electronic industry material. As the carbon nanostructure is a relatively new material, methods for controlling the carbon nanostructure's electrical and other characteristics, methods for processing the carbon nanostructure, and, furthermore, devices utilizing the carbon nanostructure are widely studied and expected to be applied to various fields.

Solution to Problem

The present inventors have diligently studied carbon nanostructure and obtained new findings as follows: More specifically, the present inventors have found such a new phenomenon that when a vibrated carbon nanostructure is exposed to an energy beam, the carbon nanostructure varies in length. Such a variation in length of the carbon nanostructure is a phenomenon caused by vibrating the carbon nanostructure or causing the carbon nanostructure to undergo similar stress, and in that condition, exposing the carbon nanostructure to an energy beam. Furthermore, the energy beam can be modified in level of energy to allow the carbon nanostructure to be varied in length in a variable amount. Furthermore, the carbon nanostructure varied in length as above also has its electrical resistance varied between before and after its variation in length. The carbon nanostructure is vibrated not only by vibrating a member having the carbon nanostructure secured thereto; vibrating a holder having a surface with the carbon nanostructure mounted thereon to indirectly vibrate the carbon nanostructure also allows the carbon nanostructure to be observed to vary in length as it is exposed to an energy beam. A method for processing a carbon nanostructure according to the present invention based on such a finding as above includes the steps of preparing a carbon nanostructure, and exposing the carbon nanostructure to an energy beam while vibrating the carbon nanostructure.

This allows the carbon nanostructure's length in one axial direction to be varied by adjusting energy radiated by the energy beam. Furthermore, according to the inventors' findings, the carbon nanostructure varied in length as it is exposed to the energy beam also has its electrical characteristics (e.g., a value in electric resistance) varied between before and after the exposure to the energy beam. This allows a plurality of types of carbon nanostructures having different lengths and/or different electrical characteristics to be obtained from one type of carbon nanostructure, for example.

Furthermore, the carbon nanostructure reduced in length as it is exposed to an energy beam has a larger surface area per unit volume than before it is exposed to the energy beam. Accordingly, applying the carbon nanostructure of the present invention to an application in which the carbon nanostructure's surface area affects its characteristics allows the characteristics to be modified as desired. For example, if the carbon nanostructure of the present invention is utilized as an electrode of a capacitor, the capacitor can have the same size as conventional and despite that have an electrode having an area and hence capacitance larger than conventional.

Note that a carbon nanostructure as referred to herein is a substance having a structure configured of carbon atoms on the order of nanometers, and it is for example a carbon nanotube (of a single layer or multiple layers).

A method for producing a carbon nanostructure according to the present invention employs the method for processing a carbon nanostructure as described above. This allows an energy beam with appropriately modified energy to be used to allow a single type of carbon nanostructure to be used as a starting material to produce therefrom a plurality of types of carbon nanostructures having different lengths and different electrical characteristics.

A carbon nanostructure according to the present invention is produced by employing the method for producing a carbon nanostructure as described above. The obtained carbon nanostructure is for example a carbon nanostructure extending in one direction and having a sidewall, and the sidewall is periodically bent relative to that one direction. The inventors observed a sidewall of a carbon nanostructure obtained by applying the method for processing the carbon nanostructure or that for producing it as described above and as a result have found that the sidewall is periodically corrugated. The periodically corrugated sidewall allows the carbon nanostructure as seen in a direction in which it extends (i.e., the one direction mentioned above) to have a surface area per unit length larger than a carbon nanostructure uncorrugated (or unexposed to an energy beam). The carbon nanostructure can thus have an increased surface area per unit volume, and if the carbon nanostructure of the present invention is applied for example to a catalyst, the catalyst can have an increased reaction area (or surface area) per unit volume.

A capacitor according to the present invention includes a pair of electrodes including a carbon nanostructure, and an electrolyte and a separator disposed between the paired electrodes. The electrode that includes the present carbon nanostructure can remain unchanged in size and despite that have a larger surface area than that including a conventional, typical carbon nanostructure. The capacitor can thus have a larger capacitance than conventional.

Advantageous Effect of Invention

The present invention can thus facilitate providing carbon nanostructures having different lengths and different electrical characteristics.

DESCRIPTION OF EMBODIMENTS

Hereinafter reference will be made to the drawings to describe the present invention in embodiments. In the figures, identical or corresponding components are identically denoted and will not be described repeatedly in detail.

Figure 1:
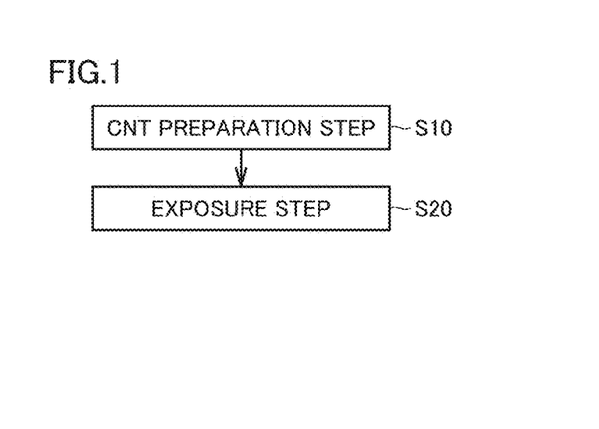
FIG. 1 is a flowchart for illustrating a method for producing a carbon nanotube according to the present invention.
Figure 2:
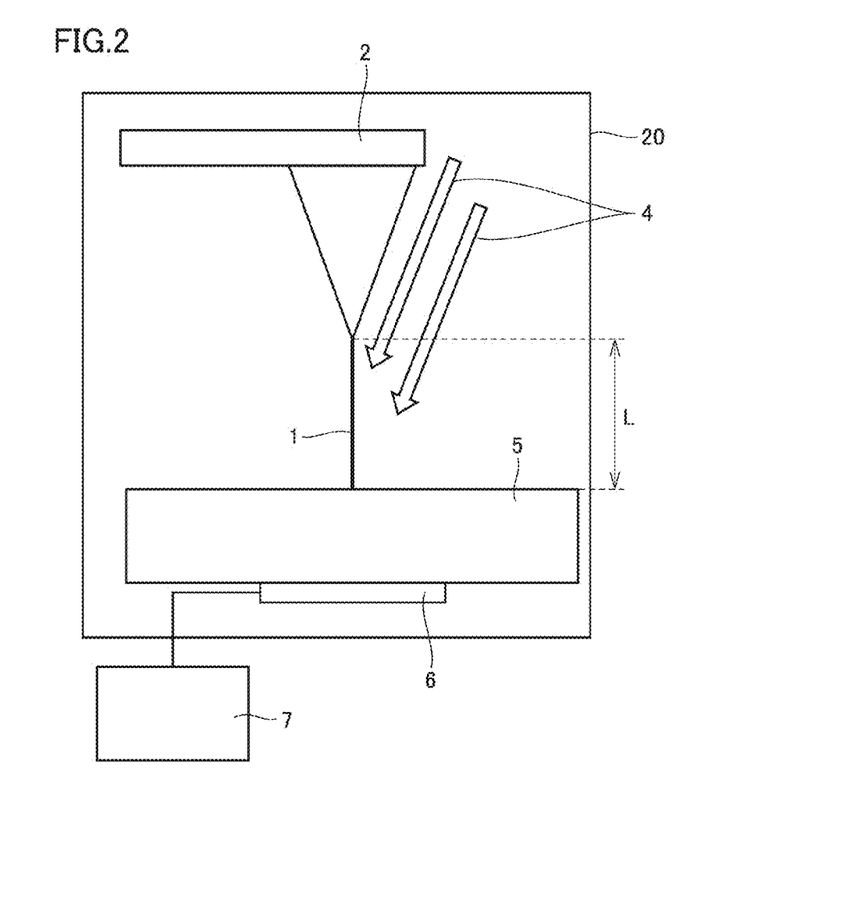
FIG. 2 is a schematic diagram for illustrating an exposure step indicated in FIG. 1.

With reference to FIG. 1 and FIG. 2, the present invention provides a method for producing a carbon nanotube, as will be described hereinafter.

As shown in FIG. 1, the present invention provides a method for producing a carbon nanotube that is one example of a carbon nanostructure, as follows: Initially, a carbon nanotube (CNT) preparation step (S10) is performed. Specifically, as shown in FIG. 2, a carbon nanotube 1 is disposed so as to connect a surface of a holder of metal 5 and a tip of a cantilever 2 therebetween. Holder 5 and carbon nanotube 1 can be connected in any method and so can carbon nanotube 1 and cantilever 2. For example, carbon nanotube 1 is brought into contact with holder 5 to electrically conduct to bond a carbon component that is adsorbed to the surface of holder 5 and carbon nanotube 1 together. As a result, as shown in FIG. 2, carbon nanotube 1 is disposed to connect cantilever 2 and the surface of holder 5.

Herein, carbon nanotube 1 can be a single-wall nanotube (SWNT) formed of a carbon layer (graphene) provided in the form of a single layer cylindrically, a multiwall nanotube (MWNT) formed of a multiple carbon layers stacked cylindrically, or the like. Carbon nanotube 1 can have a length for example equal to or larger than 1 μm and equal to or smaller than 3 μm. Furthermore, if carbon nanotube 1 is an MWNT, carbon nanotube 1 has a diameter for example of approximately 10 nm. Furthermore, if carbon nanotube 1 is an SWNT, carbon nanotube 1 has a diameter for example of approximately 2 nm.

Then, an exposure step (S20) shown in FIG. 1 is performed. More specifically, carbon nanotube 1 is exposed to an electron beam while carbon nanotube 1 is ultrasonically vibrated, as shown in FIG. 2. More specifically, carbon nanotube 1 has one end secured to holder 5, which has a back surface connected to a piezoelectric element 6. Piezoelectric element 6 is electrically connected to an oscillator 7. By controlling electric power from oscillator 7, piezoelectric element 6 ultrasonically vibrates. This ultrasonic vibration vibrates holder 5 and carbon nanotube 1 connected to holder 5. Then carbon nanotube 1 that is ultrasonically vibrated is exposed to an electron beam 4 in a previously vacuumed processing chamber 20.

Note that the ultrasonic wave can be applied in any method other than the above. For example, an ultrasonic vibrator such as piezoelectric element 6 may be connected to cantilever 2 and carbon nanotube 1 may be vibrated via cantilever 2.

Note that the ultrasonic wave applied can have a frequency with any wavelength, and the frequency can for example be 1.2 MHz. Furthermore, the electron beam can have a radiation energy value of a numerical range for example equal to or larger than 300 eV and equal to or smaller than 30 keV, more preferably equal to or larger than 1 keV and equal to or smaller than 30 keV. Thus exposing carbon nanotube 1 to an energy beam while vibrating carbon nanotube 1 allows carbon nanotube 1 to have a longitudinal length varied (e.g., reduced) as compared with that before it is exposed to the energy beam.

Figure 3:
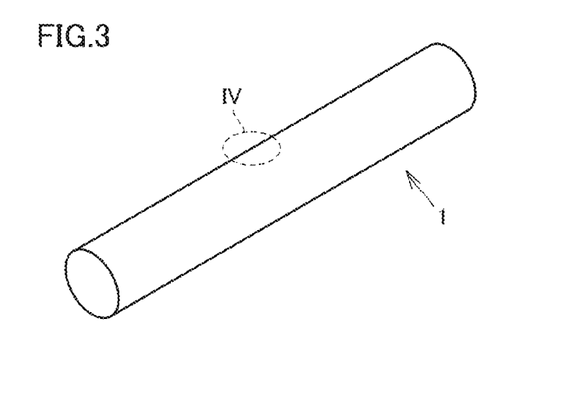
FIG. 3 is a perspective schematic view of a carbon nanotube after the exposure step is performed.
Figure 4:
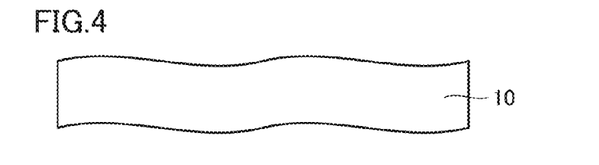
FIG. 4 schematically shows a cross section of a sidewall of the FIG. 3 carbon nanotube in a region IV.

Carbon nanotube 1 thus vibrated and therewhile exposed to an energy beam and thus reduced in length has a sidewall corrugated as shown in FIGS. 3 and 4 and hence an overall axial length shorter than before it is exposed to the energy beam.

As shown in FIG. 3 and FIG. 4, carbon nanotube 1 according to the present invention has its sidewall deformed to be periodically corrugated (or bent) relative to its axial direction (a direction in which carbon nanotube 1 extends), and thus has an overall length shorter than before it is exposed to an energy beam.

Figure 5:
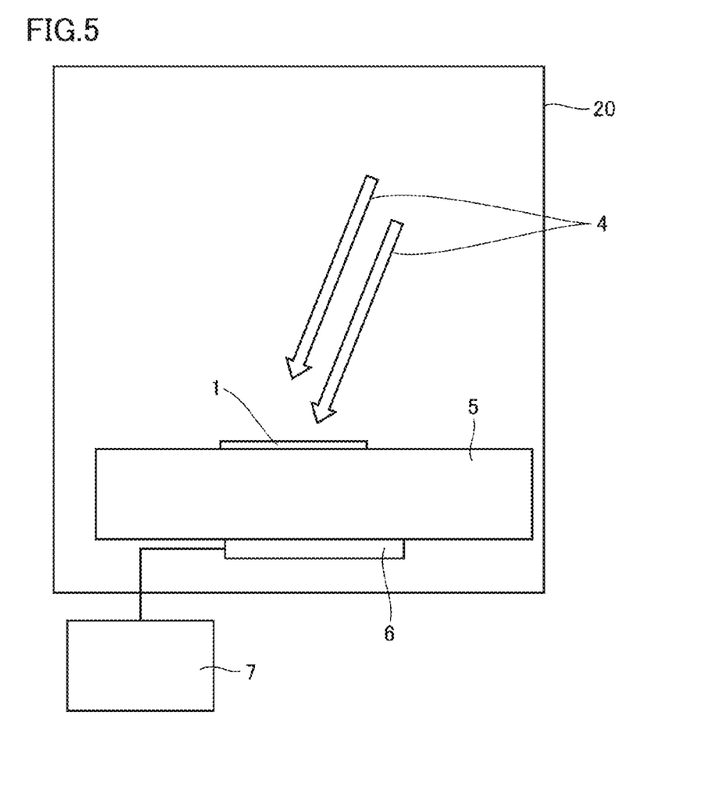
FIG. 5 schematically shows a first exemplary variation of the exposure step (S20) indicated in FIG. 1.

With reference to FIG. 5, the exposure step (S20) will be described in an exemplary variation.

The FIG. 5 exposure step is basically similar to the FIG. 2 exposure step except that how carbon nanotube 1 is disposed. More specifically, carbon nanotube 1 is disposed on a surface of holder 5, rather than secured to holder 5. In that condition, an ultrasonic wave generated by piezoelectric element 6 is used to vibrate holder 5 and carbon nanotube 1. Carbon nanotube 1 is exposed to electron beam 4 and can thus be reduced in length similarly as has been shown in FIG. 2.

While the surface of holder 5 that bears carbon nanotube 1 thereon may be flat as shown in FIG. 5, preferably, it is rough to an extent. Furthermore, as shown in FIG. 6, holder 5 may have an irregular surface.

Figure 6:
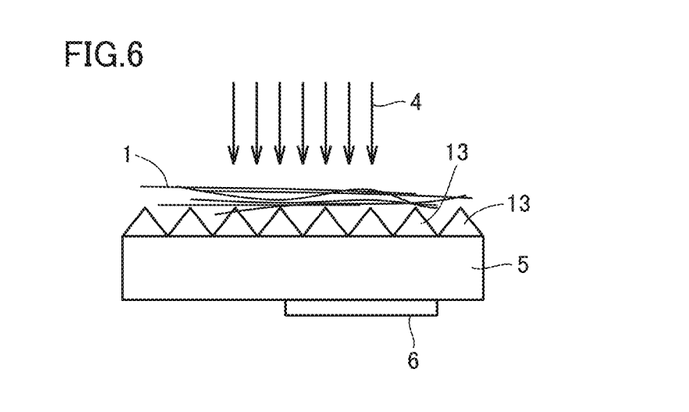
FIG. 6 schematically shows a second exemplary variation of the exposure step (S20) indicated in FIG. 1.

Holder 5 shown in FIG. 6 is basically similar in structure to holder 5 shown in FIG. 5, except for its surface condition. More specifically, holder 5 shown in FIG. 5 bears carbon nanotube 1 on a surface thereof having a plurality of projections 13. Preferably, projections 13 have their respective vertices having a distance therebetween smaller than the length of carbon nanotube 1. This allows carbon nanotube 1 to have a portion in contact with contact holder 5 over a reduced area to effectively prevent carbon nanotube 1 from adhering to the surface of holder 5. This ensures that an ultrasonic wave generated by piezoelectric element 6 vibrates carbon nanotube 1.

Figure 7:
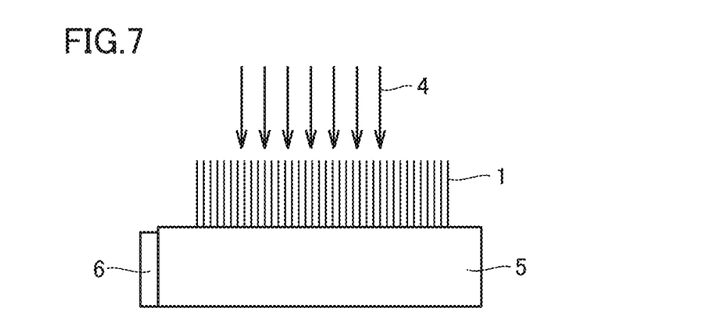
FIG. 7 schematically shows a third exemplary variation of the exposure step (S20) indicated in FIG. 1.

FIG. 7 schematically shows a third exemplary variation of the exposure step (S20) indicated in FIG. 1 and shows an exemplary variation of a method for mounting carbon nanotube 1 on holder 5. As shown in FIG. 7, a plurality of carbon nanotubes 1 may be provided on a surface of holder 5 to extend in a direction transverse (e.g., perpendicular) to that surface. Holder 5 may have a lateral end face with piezoelectric element 6 connected thereto and generating an ultrasonic wave to vibrate the plurality of carbon nanotubes 1. Exposing carbon nanotube 1 to electron beam 4 in this condition also allows carbon nanotube 1 to have a reduced length, similarly as in the structure described above.

Note that piezoelectric element 6 may be disposed similarly as shown for example in FIG. 6, i.e., on a back surface of holder 5.

Figure 8:
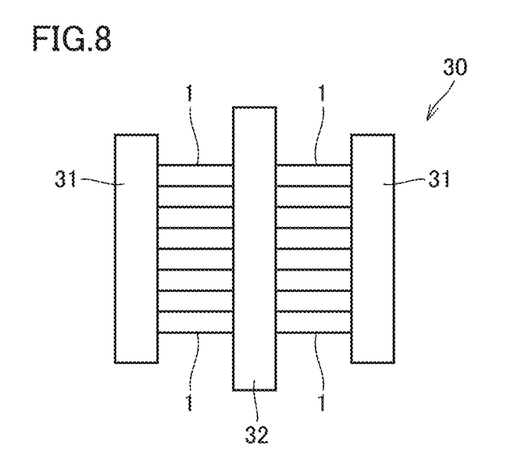
FIG. 8 schematically shows a capacitor using the carbon nanotube according to the present invention.

Thus the present method for processing a carbon nanostructure provides a carbon nanotube having a sidewall having an irregular surface and hence a larger surface area per unit volume than a conventional carbon nanotube. Accordingly, the carbon nanotube may be used in an application involving a reaction relevant to its surface area, and for example carbon nanotube 1 may be used to produce a capacitor 30 as shown in FIG. 8. With reference to FIG. 8, a capacitor using the carbon nanotube according to the present invention will be described.

With reference to FIG. 8, capacitor 30 is formed of a collector electrode 31, carbon nanotube 1 of the present invention formed on a surface of collector electrode 31, and a separator 32 disposed between two collector electrodes 31 and sandwiched by a plurality of carbon nanotubes 1. Separator 32 is impregnated with electrolyte. Capacitor 30 thus includes carbon nanotube 1 used as an electrode that has a surface area per unit volume larger than a conventional carbon nanotube, and capacitor 30 can be increased in capacitance (electrostatic capacity) while remaining unchanged in size.

Figure 9:
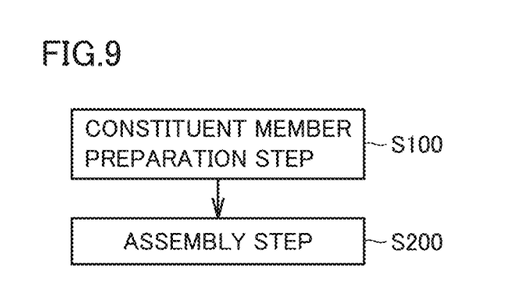
FIG. 9 is a flowchart for illustrating a method for producing the capacitor shown in FIG. 8.
Figure 10:
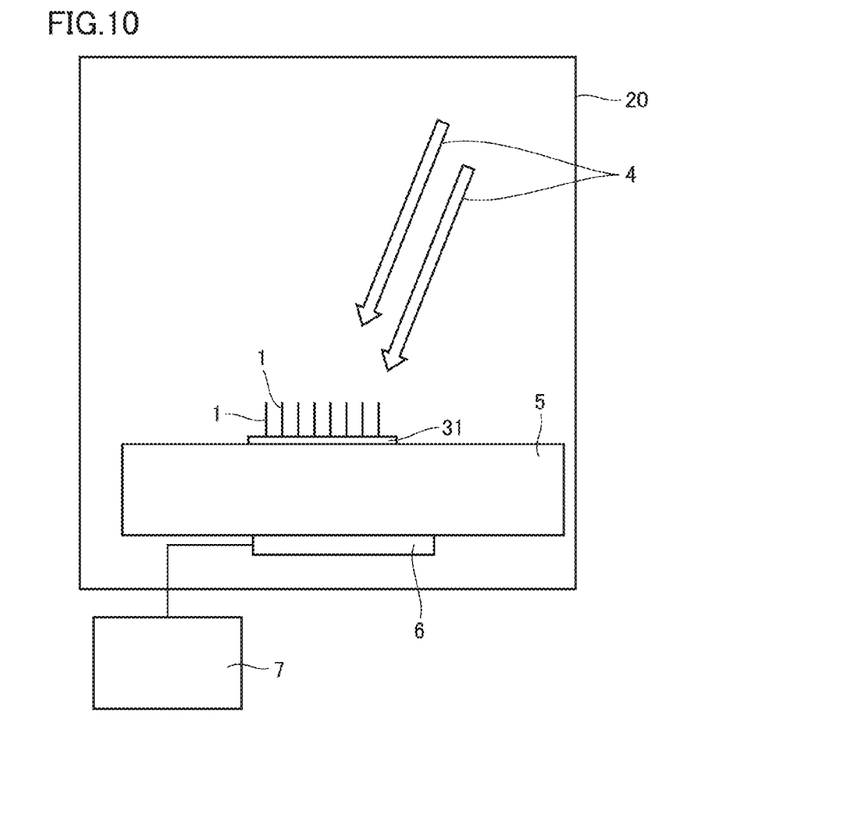
FIG. 10 is a schematic diagram for illustrating an exposure step included in a constituent member preparation step indicated in FIG. 9.

FIG. 9 is a flowchart for illustrating a method for producing the capacitor shown in FIG. 8. FIG. 10 is a schematic diagram for illustrating an exposure step included in a constituent member preparation step indicated in FIG. 9. A method for producing capacitor 30 shown in FIG. 8 will be described with reference to FIG. 9 and FIG. 10.

As shown in FIG. 9, a constituent member preparation step (S100) is initially performed. Specifically, the FIG. 8 capacitor's collector electrode 31 with a surface provided with carbon nanotube 1 and separator 32 impregnated with electrolyte are prepared. Carbon nanotube 1 can be provided on the surface of collector electrode 31 in any conventionally well known method. Collector electrode 31 provided with carbon nanotube 1 undergoes the exposure step (S20) shown in FIG. 1 according to the present invention to reduce carbon nanotube 1 in length (or form carbon nanotube 1 having a sidewall having a surface having an irregular structure).

Specifically, as shown in FIG. 10, collector electrode 31 provided with carbon nanotube 1 is mounted on holder 5. Then by controlling electric power from oscillator 7 piezoelectric element 6 is driven to generate an ultrasonic wave. The ultrasonic wave vibrates holder 5 and carbon nanotube 1, while carbon nanotube 1 is exposed to electron beam 4. Note that in doing so, preferably, processing chamber 20 is internally vacuumed (for example has an ambient pressure equal to or larger than $1\times10^{-4}$ Pa and equal to or smaller than $1\times10^{-3}$ Pa). As a result, carbon nanotube 1 has a surface with an irregular structure and is also reduced in length.

Then, an assembly step (S200) indicated in FIG. 9 is performed. Specifically, two collector electrodes 31 with carbon nanotubes attached thereto, as obtained through the process as described above, are disposed opposite and separator 32 is disposed therebetween. Capacitor 30 shown in FIG. 10 can thus be obtained.

Experiment 1

To confirm that a carbon nanotube exposed to an energy beam while vibrated has been deformed, an experiment was conducted as follows:

Specimen

An SWNT carbon nanotube was prepared as a specimen for an example of the present invention and that for a comparative example. A carbon nanotube serving as the specimen of the example of the present invention was disposed to connect holder 5 and cantilever 2 therebetween, as shown in FIG. 2. In contrast, a carbon nanotube serving as the specimen of the comparative example had one end secured to a probe needle 3. Note that the prepared carbon nanotubes had a diameter of approximately 2.0 nm and a length of approximately 1.0 μm. Note that the carbon nanotube used herein was provided in the form of a bundle of a plurality of carbon nanotubes, and the carbon nanotube bundle had a diameter of approximately 100 nm. Hereinafter, this carbon nanotube bundle will also simply be referred to as a carbon nanotube.

Experiment

Each specimen prepared as described above was exposed to an electron beam serving as an energy beam, as has been described with reference to FIG. 2. It should be noted, however, that for the example of the present invention, the specimen was exposed to the electron beam with piezoelectric element 6 applying an ultrasonic wave having a frequency of 1.2 MHz, whereas for the comparative example, the specimen was not vibrated when it was exposed to the electron beam. Specifically, the specimen of the example of the present invention and that of the comparative example were exposed to an electron beam radiating an energy of 5 keV.

Result

A result of the above experiment will be described with reference to FIG. 11 and FIG. 12. Note that FIG. 11(a) and FIG. 12(a) show photographic images of the specimens before they were exposed to the electron beam, and FIG. 11(b) and FIG. 12(b) show photographic images of the specimens after they were exposed to the electron beam.

Figure 11:
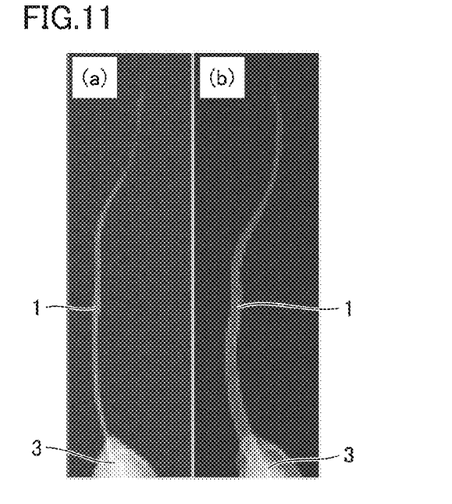
FIG. 11 is a photographic image of what states a specimen of a comparative example of an experiment 1 has before and after it is exposed to an electron beam.
Figure 12:
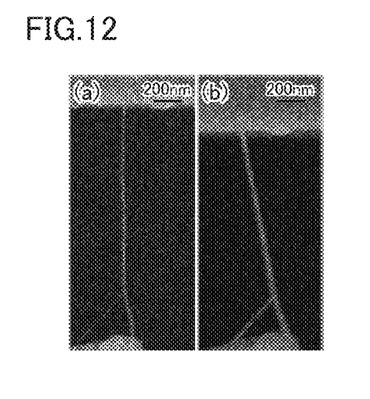
FIG. 12 is a photographic image of what states a specimen of an example of the present invention of experiment 1 has before and after it is exposed to an electron beam.

As shown in FIG. 11, the carbon nanotube exposed to the electron beam while it was not vibrated, i.e., the specimen of the comparative example, was not observed to have significant variation in length. In the example of the present invention, in contrast, it has been observed that the carbon nanotube had a varied axial length. Specifically, with reference to FIG. 12, the carbon nanotube exposed to an electron beam having an energy of 5 keV while it was vibrated had a length reduced to approximately 80-90% of that before it was exposed to the electron beam (see FIG. 12(a)), as shown in FIG. 12(b). As can be seen from FIG. 11 and FIG. 12, it has been shown that simply exposing the carbon nanotube to an electron beam does not change the carbon nanotube in length and that exposing the carbon nanotube to an electron beam while vibrating the carbon nanotube varies the carbon nanotube in length.

Experiment 2

To examine what relationship the electron beam's dosage in the exposure step has with how much amount in length the carbon nanotube varies, and how differently the carbon nanotube is affected by different manners of applying stress thereto, an experiment was conducted as follows:

Specimen

As a specimen, a carbon nanotube (a single wall nanotube (SWNT)) was prepared. Note that the prepared SWNT had a diameter of approximately 2.0 nm and a length of approximately 1.0 μm. Then, four experiment systems were prepared having such carbon nanotubes secured to connect a holder and a cantilever therebetween, as shown in FIG. 2.

Experiment

In each experiment system, the specimen, or the carbon nanotube, underwent stress in different conditions and in addition the carbon nanotube was exposed to an electron beam in different doses, and how the carbon nanotube varied in length was thus observed. The electron beam was dosed in a range of 0-0.08 C/cm$^2$. Note that the electron beam's acceleration voltage was set to 5 keV.

The carbon nanotube underwent stress in the following four conditions: 1) neither tensile stress nor vibration was applied; 2) tensile stress was singly applied; 3) ultrasonic vibration was singly applied; and 4) tensile stress and ultrasonic vibration were both applied. The ultrasonic vibration was applied with an ultrasonic wave having a frequency of 1.2 MHz. Furthermore, the tensile stress applied had a value of approximately 0.8 GPa.

Result

How the carbon nanotube varied in length was evaluated by an index referred to as a shrinkage rate. Herein, a shrinkage rate is ((the carbon nanotube's length before the exposure to the electron beam) minus (the carbon nanotube's length after the exposure to the electron beam)) divided by (the carbon nanotube's length before the exposure to the electron beam). A result thereof is shown in FIG. 13.

Figure 13:
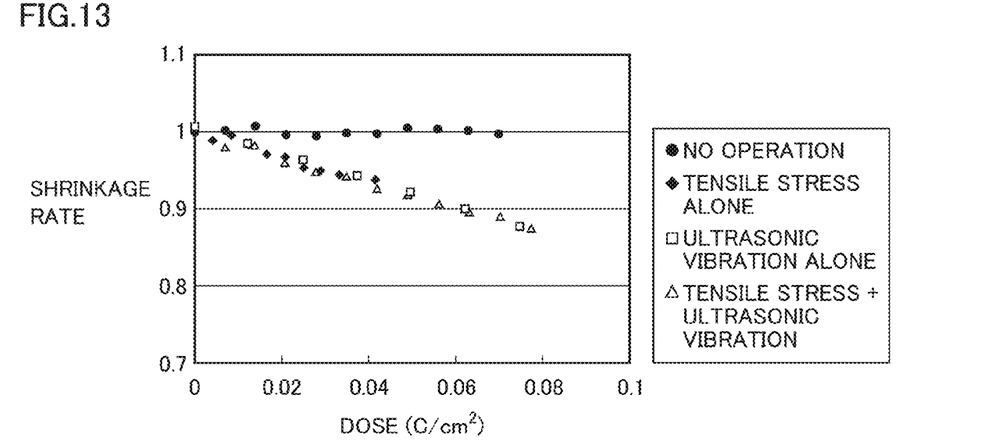
FIG. 13 is a graph representing a result of an experiment 2.

FIG. 13 is a graph representing a result of the experiment with the axis of abscissa representing a radiated electron beam in dose. The unit of the axis of abscissa is C/cm$^2$. Furthermore, the axis of ordinate represents the shrinkage rate as described above. Furthermore, in FIG. 13, the data for condition 1 (no operation: neither vibration nor tensile stress applied) is represented by a black circle, and the data for condition 2 (tensile stress alone) is represented by a black rhombus. Furthermore, the data for condition 3 (ultrasonic vibration alone) is represented by a white square, and the data for condition 4 (tensile stress+ultrasonic vibration) is represented by a white triangle.

As can also be seen from FIG. 13, there was no substantial difference between the data for conditions 2-4. It is believed that this indicates that applying ultrasonic vibration and applying tensile stress are equivalent as an operation in the present method for processing a carbon nanostructure. Note that it can be seen from the FIG. 13 graph that increasing the electron beam in dosage provides a shrinkage rate having a reduced value (i.e., provides shrinkage in an increased amount). In contrast, under condition 1, i.e., with neither vibration nor tensile stress applied, exposing the carbon nanotube to an electron beam did not substantially vary the carbon nanotube in length.

Experiment 3

Then, the carbon nanotube was subjected to a resonance Raman shift measurement before and after the exposure step performed with an ultrasonic wave applied thereto.

Specimen

An SWNT was prepared as a specimen. As has been done in experiment 2, the SWNT was secured between holder 5 and cantilever 2, as shown in FIG. 2. Note that the prepared SWNT had a diameter of approximately 2.0 nm and a length of approximately 1.0 μm.

Experiment

The prepared specimen was initially subjected to a resonance Raman shift measurement before it was exposed to an electron beam. Subsequently the specimen was exposed to an ultrasonic wave and in that condition the specimen was exposed to the electron beam. After the carbon nanotube was exposed to the electron beam, the carbon nanotube was again subjected to the resonance Raman shift measurement. Note that the radiated electron beam had an energy set to 5 keV and the carbon nanotube was exposed thereto until the carbon nanotube shrank in length by approximately 3%.

Note that the resonance Raman shift measurement was done with a micro Raman spectrophotometer. The micro Raman spectrophotometer was used with a light source implemented as a He—Ne laser having a wavelength is 632.8 nm. Note that the micro Raman spectrophotometer typically includes: a light source (a laser light source) emitting the laser beam as described above; an optical system allowing the laser beam emitted from the light source to pass through an objective lens of a microscope and thus be incident on a specimen to be analyzed; a spectroscope for splitting light scattered from the specimen (a Raman scattering component); a filter for introducing the scattered light into the spectroscope; and a detector for detecting the Raman scattering component split by the spectroscope. The detector can for example be an optical multichannel analyzer using a CCD.

Result

Figure 14:
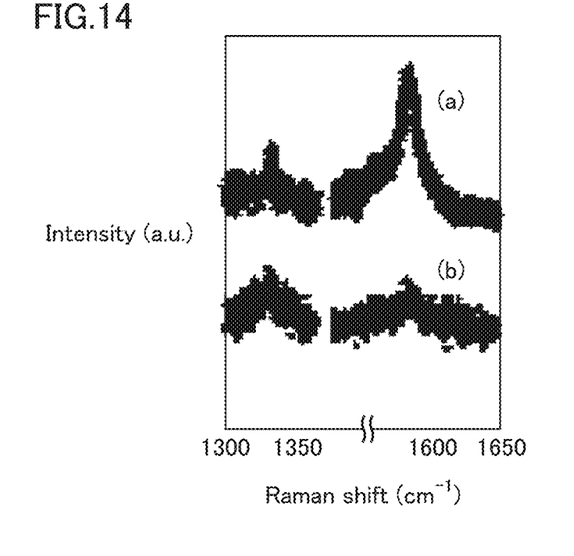
FIG. 14 is a graph representing a result of an experiment 3.

The above measurement result will be described with reference to FIG. 14. In FIG. 14, the axis of abscissa represents Raman shift (unit: cm$^{-1}$), and the axis of ordinate represents intensity as measured (unit: arbitrary). In FIG. 14, (a) denotes a graph (or an upper curve) representing data measured before the exposure to the electron beam, whereas (b) denotes a graph (or a lower curve) representing data measured after the exposure to the electron beam (i.e., after the carbon nanotube shrank in length by 3%).

As can be seen from FIG. 14, before the electron beam was applied to the carbon nanotube, a G band peak was observed, whereas after the electron beam was applied to the carbon nanotube, the G band peak was significantly decreased in intensity.

Hereinafter, a configuration characteristic to the present invention will be enumerated although some thereof overlap the embodiments described above. A method for processing a carbon nanostructure according to the present invention includes the steps of preparing a carbon nanostructure (e.g., carbon nanotube 1) (a CNT preparation step (S10)), and exposing carbon nanotube 1 to an energy beam (e.g., an electron beam) while vibrating carbon nanotube 1 (an exposure step (S20)). Note that the energy beam other than the electron beam can for example be light, an x ray or a similar electromagnetic wave, corpuscular radiation or any similar radiation.

This allows carbon nanotube 1 as seen in one axial direction to be modified in length by adjusting the energy radiated by the electron beam. Furthermore, according to the inventors' findings, carbon nanotube 1 varied in length as it is exposed to the energy beam also has its electrical characteristics (e.g., a value in electric resistance) varied between before and after the exposure to the electron beam. This allows a plurality of types of carbon nanotubes having different lengths and/or different electrical characteristics to be obtained from one type of carbon nanotube 1, for example.

Furthermore, carbon nanotube 1 varied in length as it is exposed to the energy beam, as described above, has a larger surface area per unit volume than before it is exposed to the energy beam. Accordingly, applying carbon nanotube 1 of the present invention to an application in which carbon nanotube 1's surface area affects its characteristics allows the characteristics to be modified as desired. For example, if carbon nanotube 1 of the present invention is utilized as an electrode of capacitor 30, capacitor 30 can have an electrode having a larger area than conventional while capacitor 30 has the same size as conventional, and capacitor 30 can have a larger capacitance than conventional.

The method for processing a carbon nanostructure, as described above, may include the step of exposing carbon nanotube 1 to an energy beam (the exposure step (S20)) while ultrasonically vibrating carbon nanotube 1. Note that the ultrasonic vibration applied can have a frequency for example of 10 kHz or larger. Thus ultrasonically vibrating carbon nanotube 1 allows a locally sufficiently large stress to be applied to carbon nanotube 1. This ensures that the energy beam causes carbon nanotube 1 to vary in length. The ultrasonic vibration applied can preferably be set in frequency to 20 kHz or larger. Furthermore, the ultrasonic vibration can have an upper limit in frequency set for example to 10 MHz.

The method for processing a carbon nanostructure, as described above, may include the step of exposing carbon nanotube 1 to an energy beam (the exposure step (S20)) while vibrating carbon nanotube 1 in such a manner that, as shown in FIG. 5, carbon nanotube 1 is mounted on a surface of holder 5 and in that condition holder 5 is vibrated. In that case, carbon nanotube 1 is simply placed on holder 5, and it is not necessary to connect carbon nanotube 1 to holder 5. This facilitates performing the method for processing a carbon nanostructure according to the present invention.

The method for processing a carbon nanostructure, as described above, may include the step of exposing carbon nanotube 1 to an energy beam (the exposure step (S20)) while vibrating carbon nanotube 1 in such a manner that, as shown in FIGS. 2 and 7, carbon nanotube 1 has at least a portion secured to a surface of holder 5 and in that condition holder 5 is vibrated. This ensures that carbon nanotube 1 is vibrated and hence carbon nanotube 1 exposed to the energy beam is reduced in length.

The method for processing a carbon nanostructure, as described above, may include the step of preparing a carbon nanostructure (the CNT preparation step (S10)) in such a manner that, as shown in FIG. 10, carbon nanotube 1 is secured to a surface of collector electrode 31 serving as a support, and the step of exposing carbon nanotube 1 to an energy beam (the exposure step (S20)) while vibrating carbon nanotube 1 in such a manner that collector electrode 31 with carbon nanotube 1 secured thereto is mounted on a surface of holder 5 and in that condition holder 5 is vibrated. Note that holder 5 may be vibrated in a manner as follows: piezoelectric element 6 serving as a vibration generating member may be connected to holder 5 and driven to (ultrasonically) vibrate holder 5.

This allows a component including carbon nanotube 1 (e.g., a capacitor electrode that is collector electrode 31 having a surface with a plurality of carbon nanotubes 1 connected thereto) to be exactly mounted on holder 5 to allow carbon nanotube 1 to be varied in length (i.e., have a sidewall periodically bent (or provided with irregularity). This allows a component that is previously prepared using carbon nanotube 1 to be subsequently subjected to the method for processing a carbon nanostructure according to the present invention to vary in length (or geometrically) carbon nanotube 1 included in that component. This allows the component to have its characteristics varied ex post.

The method for processing a carbon nanostructure, as described above, may include the exposure step (S20) with the energy beam implemented as an electron beam. This ensures that carbon nanotube 1 varies in length. Furthermore, the electron beam is changeable in energy level by changing a voltage applied to accelerate electrons, and the electron beam can thus be easily changed in energy level to adjust carbon nanotube 1 in length and electrical characteristics.

The method for processing a carbon nanostructure, as described above, may be performed with the energy beam having an energy equal to or larger than 1 keV and equal to or smaller than 30 keV. This ensures that carbon nanotube 1 exposed to the electron beam is reduced in length. Furthermore, this allows carbon nanotube 1 to have electrical resistance having a value higher than before it is exposed to the electron beam. Herein, the electron beam's energy preferably has a lower limit set to 3 keV or larger, more preferably 5 keV or larger. Note that preferably the electron beam or similar energy beam radiates energy of at least 300 eV, which is a threshold value to excite an inner-shell electron of a carbon atom serving as a constituent of the carbon nanostructure.

The method for processing a carbon nanostructure, as described above, may include the exposure step (S20) in such a manner that carbon nanotube 1 is vibrated while heated and in that condition carbon nanotube 1 is exposed to an energy beam (e.g., an electron beam). In that case, carbon nanotube 1 can be heated in a different condition so that if the energy beam provides energy fixed in level carbon nanotube 1 can nonetheless be deformed (extended/reduced in length) to a different extent or have electrical characteristics modified and/or the like. That is, how carbon nanotube 1 should be varied in length, electrical characteristics and the like can be controlled by energy radiated by the energy beam and in addition thereto how carbon nanotube 1 is heated. This provides an increased degree of freedom in modifying carbon nanotube 1 in length, electrical characteristics and the like.

A method for producing a carbon nanostructure (e.g., carbon nanotube 1) according to the present invention employs the method for processing a carbon nanostructure, as described above. This allows an energy beam with appropriately modified energy to be used to allow a single type of carbon nanostructure (carbon nanotube 1) to be used as a starting material to produce therefrom a plurality of types of carbon nanostructures having different lengths and different electrical characteristics.

A carbon nanostructure according to the present invention that is implemented as carbon nanotube 1 is produced using the method for producing a carbon nanostructure, as described above. More specifically, according to the present invention, carbon nanotube 1 is a carbon nanotube extending in one direction and having a sidewall, and the sidewall is periodically bent relative to that one direction, as shown in FIG. 4. The periodically bent sidewall allows carbon nanotube 1 as seen in a direction in which it extends (i.e., the one direction mentioned above) to have a surface area per unit length larger than a carbon nanotube which is not bent (or exposed to an energy beam). Carbon nanotube 1 can thus have an increased surface area per unit volume, and if carbon nanotube 1 of the present invention is applied for example to a catalyst, the catalyst can have an increased reaction area (or surface area) per unit volume.

According to the present invention, a capacitor includes a pair of electrodes including carbon nanotube 1 that is one example of the carbon nanostructure as described above (collector electrode 31 having a surface with a plurality of carbon nanotubes 1 connected thereto), and an electrolyte and separator 32 disposed between the paired electrodes, as shown in FIG. 8. The electrode that includes carbon nanotube 1 of the present invention can have a larger surface area than that including a conventional, typical carbon nanotube, while the electrode can remain unchanged in size. The capacitor can thus have a larger capacitance than conventional.

It should be understood that the embodiments disclosed herein have been described for the purpose of illustration only and in a non-restrictive manner in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention is advantageously applicable to a linear carbon nanostructure extending in a predetermined direction, in particular.

REFERENCE SIGNS LIST

1: carbon nanotube; 2: cantilever; 3: probe needle; 4: electron beam; 5: holder; 6: piezoelectric element; 7: oscillator; 13: projection; 20: processing chamber; 30: capacitor; 31: collector electrode; 32: separator.

The invention claimed is:

1. A method for processing a carbon nanostructure, comprising the steps of:
   preparing a carbon nanostructure; and
   exposing said carbon nanostructure to an energy beam while vibrating said carbon nanostructure by a means different from said energy beam.

2. The method for processing a carbon nanostructure according to claim 1, wherein the step of exposing said carbon nanostructure to said energy beam is performed with said carbon nanostructure ultrasonically vibrated.

3. The method for processing a carbon nanostructure according to claim 1, wherein the step of exposing said carbon nanostructure to said energy beam is performed in such a manner that said carbon nanostructure is mounted on a surface of a holder and in that condition said holder is vibrated to vibrate said carbon nanostructure.

4. The method for processing a carbon nanostructure according to claim 1, wherein the step of exposing said carbon nanostructure to said energy beam is performed in such a manner that said carbon nanostructure has at least a portion secured to a surface of a holder and in that condition said holder is vibrated to vibrate said carbon nanostructure.

5. The method for processing a carbon nanostructure according to claim 1, wherein:
   the step of preparing said carbon nanostructure is performed with said carbon nanostructure secured to a surface of a support; and
   the step of exposing said carbon nanostructure to said energy beam is performed in such a manner that said support with said carbon nanostructure secured thereto is mounted on a surface of a holder and in that condition said holder is vibrated to vibrate said carbon nanostructure.

6. The method for processing a carbon nanostructure according to claim 1, wherein the step of exposing said carbon nanostructure to said energy beam is performed with said energy beam provided in a form of an electron beam.

7. The method for processing a carbon nanostructure according to claim 6, wherein said electron beam has an energy equal to or larger than 1 keV and equal to or smaller than 30 keV.

8. A method for producing a carbon nanostructure, that employs the method for processing a carbon nanostructure according to claim 1.

9. A carbon nanostructure produced using the method for producing a carbon nanostructure according to claim 8.

10. A capacitor comprising:
    a pair of electrodes including a carbon nanostructure according to claim 9; and
    an electrolyte and a separator disposed between said pair of electrodes.

* * * * *